C. Abbott.
Farm Fence.
N° 91,585. Patented Jan. 22, 1869.
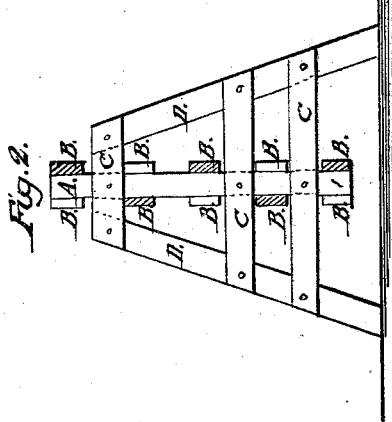
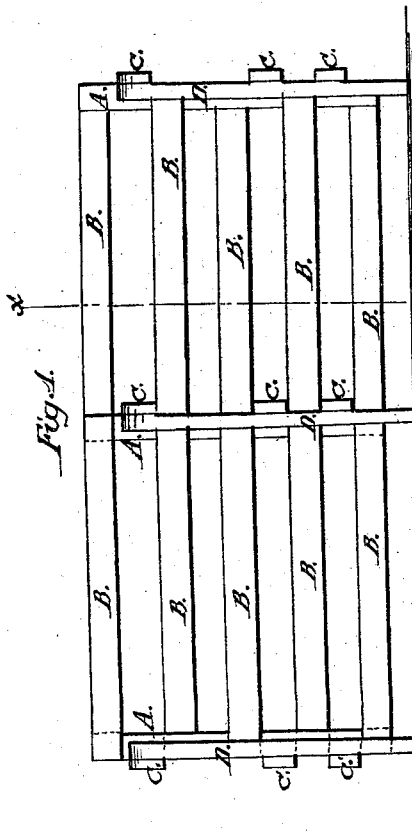
Witnesses:
O. Hinchman
Jno. F. Brooks
Inventor:
Cyrus Abbott
per Munn & Co. Atty

CYRUS ABBOTT, OF IOWA CITY, IOWA.

Letters Patent No. 91,585, dated June 22, 1869.

---

IMPROVEMENT IN FARM-FENCE.

---

The Schedule referred to in these Letters Patent and making part of the same.

---

*To all whom it may concern:*

Be it known that I, CYRUS ABBOTT, of Iowa City, in the county of Johnson, and State of Iowa, have invented a new and improved Farm-Fence; and I do hereby declare that the following is a full, clear, and exact description thereof, which will enable others skilled in the art to make and use the same, reference being had to the accompanying drawing, forming part of this specification, in which—

Figure 1 is a side view of a portion of my improved fence.

Figure 2 is a vertical cross-section of the same, taken through the line $x$–$x$, fig. 1.

Similar letters of reference indicate corresponding parts.

My invention has for its object to furnish a simple, strong, and durable fence, so constructed and arranged that the body of the fence may be supported free from the ground, so as not to be liable to decay from contact with the ground; and It consists in the fence constructed and arranged as hereinafter more fully described.

A are the posts, which may be made of timber, about three inches square, and from four and a half to five feet long.

B are the longitudinal bars or boards of the fence, which may be of any desired length, and which are attached alternately to the opposite sides of the posts A, as shown in figs. 1 and 2.

C are ties, or cross-bars, the middle parts of which are securely attached to the posts A, between the boards or longitudinal bars B, as shown in the drawings.

To the ends of the ties, or cross-bars C, are attached the brace or supporting-bars D, the lower ends of which are inclined outward, and rest upon the ground, to support the fence, so that the main part or body of the fence may be supported free from the ground, and be thus protected from decay by contact with the ground.

The only part of the fence in contact with the ground is the lower ends of the inclined brace-bars D, and when these rot off they can readily be repaired by attaching extra strips to their sides, without it being necessary to disturb the rest of the fence.

Having thus described my invention,

What I claim as new, and desire to secure by Letters Patent, is—

An improved fence, formed by the combination of the posts or vertical bars A, boards or longitudinal bars B, ties or cross-bars C, and inclined brace or supporting-bars D, with each other, substantially in the manner herein shown and described, and for the purpose set forth.

CYRUS ABBOTT.

Witnesses:
S. COLDREN,
E. W. JOY.